United States Patent
Pereira

(10) Patent No.: US 9,378,367 B2
(45) Date of Patent: Jun. 28, 2016

(54) SYSTEMS AND METHODS FOR IDENTIFYING A SOURCE OF A SUSPECT EVENT

(71) Applicant: Symantec Corporation, Mountain View, CA (US)

(72) Inventor: Shane Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/231,409

(22) Filed: Mar. 31, 2014

(65) Prior Publication Data

US 2015/0278518 A1    Oct. 1, 2015

(51) Int. Cl.
*G06F 21/00* (2013.01)
*G06F 21/55* (2013.01)

(52) U.S. Cl.
CPC .................................... *G06F 21/554* (2013.01)

(58) Field of Classification Search
CPC combination set(s) only.
See application file for complete search history.

(56) References Cited

U.S. PATENT DOCUMENTS

| | | | |
|---|---|---|---|
| 7,685,638 B1 * | 3/2010 | Buches | 726/22 |
| 8,205,257 B1 | 6/2012 | Satish et al. | |
| 8,646,084 B1 | 2/2014 | Pavlyushchik et al. | |
| 2012/0311708 A1 | 12/2012 | Agarwal et al. | |
| 2014/0068774 A1 | 3/2014 | Nie | |

OTHER PUBLICATIONS

PCT/US2015/018412—International Search Report and Written Opinion, dated May 18, 2015.

* cited by examiner

*Primary Examiner* — Ghazal Shehni
(74) *Attorney, Agent, or Firm* — Holland & Hart LLP

(57) ABSTRACT

A computer-implemented method for identifying a source of a suspect event is described. In one embodiment, system events may be registered in a database. A suspicious event associated with a first process may be detected and the first process may be identified as being one of a plurality of potential puppet processes. The registered system events in the database may be queried to identify a second process, where the second process is detected as launching the first process.

20 Claims, 7 Drawing Sheets

SYSTEMS AND METHODS FOR IDENTIFYING A SOURCE OF A SUSPECT EVENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a computer-implemented method identifying a source of a suspect event is described. In one embodiment, system events may be registered in a database. In some cases, the system events are registered via a kernel-mode driver. The system events may include any detectable event occurring in a computer system. In some cases, the system events may include process launch events, file system events, and the like. A suspicious event associated with a first process may be detected and the first process may be identified as being one of a plurality of potential puppet processes. The registered system events in the database may be queried to identify a second process, where the second process is detected as launching the first process.

In some embodiments, a notification may be generated. The notification may identify the second process as the source of the suspect event and/or indicate the second process is a potential malicious program. It may be determined that the second process closes upon launching the first process. Upon identifying the second process that launches the first process, the first process may be identified as a puppet process.

In one embodiment, the first process may be launched via instructions supplied directly on a command line interface by the second process. Additionally, or alternatively, the first process may be launched via instructions from at least one file, a path to the at least one file being supplied on a command line interface by the second process. A list of potential puppet processes may be maintained such as in a database. A puppet process may be any process that may be configured, by another, separate process, to execute a set of instructions. A new puppet process may be detected via the registered system events and the new puppet process may be added to the list of potential puppet processes. The list of potential puppet processes may include at least one process with a command line interface. In some cases, the list of potential puppet processes may include at least one of cmd.exe, rundll.exe, rundll32.exe, regsvr32.exe, dllhost.exe, regedit.exe, taskhost.exe, cscript, wscript, vbscript, perlscript, bash, ldconfig, terminal.app, and x-code.app.

A computing device configured to identify a source of a suspect event is also described. The device may include a processor and memory in electronic communication with the processor. The memory may store instructions that are executable by the processor to register system events in a database, detect a suspicious event associated with a first process, identify the first process as being one of a plurality of potential puppet processes, and query the registered system events in the database to identify a second process, the second process launching the first process.

A computer-program product to identify a source of a suspect event is also described. The computer-program product may include a non-transitory computer-readable medium that stores instructions. The instructions may be executable by a processor to register system events in a database, detect a suspicious event associated with a first process, identify the first process as being one of a plurality of potential puppet processes, and query the registered system events in the database to identify a second process, the second process launching the first process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
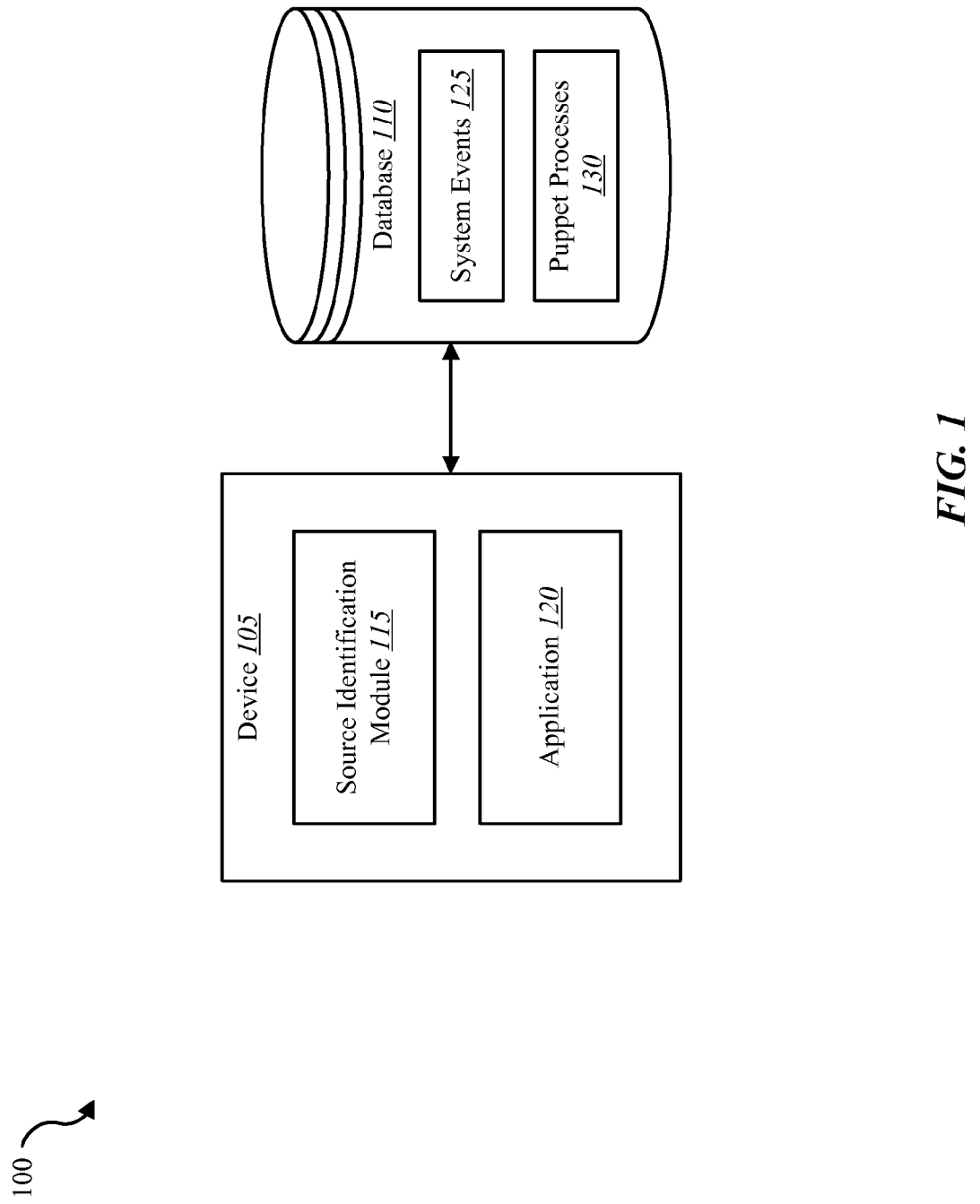
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to identifying a source of a suspect event. More specifically, the systems and methods described herein relate to detecting a puppet process executing potentially malicious instructions resulting in a suspect event and identifying the source of the potentially malicious instructions.

Creators of malicious software are constantly evolving their techniques to adapt to malware detection systems. Current file-based malware detection systems are often behind the curve when it comes to detecting adaptable malware such as polymorphic malware. Accordingly, malware detection systems may employ behavioral learning engines to identify detection-eluding, polymorphic malware. Such behavioral engines may detect new, uncategorized malware purely based on how the malware behaves. Observing the behaviors of one or more processes enables the systems and methods described herein to tie suspect events to a root process (e.g., a malicious process, malicious executable, etc.), the process that is ultimately responsible for the suspect events. For example, if the behavioral engine were to see an attempt to write to the Run or RunOnce registry key, the behavioral engine may ascertain which process is ultimately responsible for the write command, enabling the behavioral engine to take action against the responsible process, such as terminating that process and/or deleting a file associated with that process.

In some cases, by the time a current system detects a malware event, the root process of the malware event has terminated itself in order to mask its involvement in the malware event. Malware authors may employ a Windows Signed process to perform their malicious attacks because malware creators realize that the typical behavioral engine is configured to take no remedial action against legitimate Windows processes, as doing so may destabilize the machine and/or disrupt a critical functionality. Thus, in some cases, malware authors may use a "puppet" process to perform their malicious attacks. A puppet process may be any secondary process employed by a primary process to accomplish one or more actions by proxy. The processes exhibit no behavior when run, they simply exit. The secondary processes do what they are told via the command line etc., hence, the term "puppet." For example, a malware author may create a malicious process, the primary process, that is configured to employ a Windows process such as cmd.exe or rundll32.exe, the secondary or puppet process. In some cases, the malicious process may utilize a process with a command line interface. The malicious process may provide malicious instructions directly on a command line as one or more command line instructions. Additionally, or alternatively, the malicious process may provide the malicious instructions in a file where a path to the file is passed on the command line. Thus, the malicious process may configure the Windows process to execute one or more malicious instructions on behalf of the malicious process. Once the malicious process configures the secondary process to execute the malicious instructions, the malicious process may attempt to cover its tracks by closing, leaving only the secondary process to be seen. Once the malicious process has configured the secondary process with malicious instructions the malicious process closes, leaving the secondary process to perform the instructions with the malicious process closed and seemingly nowhere to be seen. Accordingly, in some embodiments, determining that a first process configures a second process, and detecting a suspect event from the secondary process may indicate that the suspect event and launching process are malicious. In some cases, determining that second process includes a command line interface may indicate that the suspect event and launching process are malicious. Additionally, or alternatively, determining that the launching process closes upon launching the puppet process may indicate that the suspect event and launching process are malicious.

In one embodiment, the systems and methods described herein may keep and maintain a list of potential puppet processes (e.g., by exe name, image name, process name, process characteristics, application description, etc.). The list may include those processes known to have been used as a puppet process in the past and/or those processes known to be capable of being used as a puppet process. The list of known windows puppet processes may include one or more command line interfaces. For example, the list may include rundll32.exe, regsvr32.exe, cscript, wscript, dllhost.exe, taskhost.exe, cmd.exe, terminal.app, x-code.app, bash, and the like.

In one example, the puppet process may receive malicious instructions directly on a command line. The systems and methods may track such process launches using a kernel-mode driver, and upon launch of such a puppet process, the identified process that launched the puppet process may be identified and held responsible for any suspicious event arising from the puppet process. In some cases, the puppet process may receive instructions indirectly via a path to a file (e.g., .BAT file, .CMD file, .BTM file, .MSC file, .JOB file, .IDL file, .TLB file, .EXE file, .DLL file, .APP file, etc.) provided on a command line. The file may contain further instructions (e.g., rundll32.exe), and/or a path to a special formatted instruction file such as a .REG file in the case of regedit.exe being used as a puppet process. In some cases, a puppet process may be instructed to look up in the registry a Component Object Model (COM) object Globally Unique Identifier (GUID) in order to locate the path to the COM dynamic linked library (DLL) from which instructions may be retrieved. Such malicious files and/or malicious instructions may be referred to as "dead drop" files and/or "dead drop" instructions because the responsible malicious process "drops" its package and is already "dead" (i.e., closed) by the time the package is being executed. The malware may create these dead drop files and instruct an operating system to launch a puppet process to use that dead drop file as a source for its instructions on what to execute. Accordingly, the systems and methods described herein may employ a kernel-mode driver to trace the creation of dead-drop files to the process that created them. In some cases, the systems and methods may monitor all process launches. Upon identifying a puppet process launch, via a command-line that directly/indirectly receives these dead-drop files, the systems and methods may identify the process ultimately responsible for the dead-drop file (e.g., a malicious process, malicious executable, etc.) and take remedial action accordingly.

FIG. 1 is a block diagram illustrating one embodiment of an environment 100 in which the present systems and methods may be implemented. In some embodiments, the systems and methods described herein may be performed on a single device (e.g., device 105). For example, a source identification module 115 may be located on the device 105. Examples of devices 105 include mobile devices, smart phones, personal computing devices, computers, servers, etc.

In some configurations, a device 105 may include a source identification module 115 and an application 120. The application 120 may allow the device 105 to interface with the source identification module 115. In one example, the device 105 may be coupled to a database 110. In one embodiment, the database 110 may be internal to the device 105. In another embodiment, the database 110 may be external to the device 105. In some configurations, the database 110 may include system events 125 and puppet processes 130. The system events 125 may include process launch events, file system events, and the like. In some cases, puppet processes 130 may include a list of one or more potential puppet processes. The list may include a process known to have been used as a puppet process and/or a process likely to be used as a puppet process. For example, a process may be considered likely to be used as a puppet process because of one or more characteristics of the process. For example, in some cases, a process that includes a command line interface may be more likely than not to be used as a puppet process.

The source identification module 115 may identify a source of a suspicious event by detecting a suspect event, determining whether a certain process is on a list of potential puppet processes (e.g., puppet processes 130), querying stored system events 125, and/or generating a notification regarding the detected suspect event. Further details regarding the source identification module 115 are discussed below.

Figure 2:
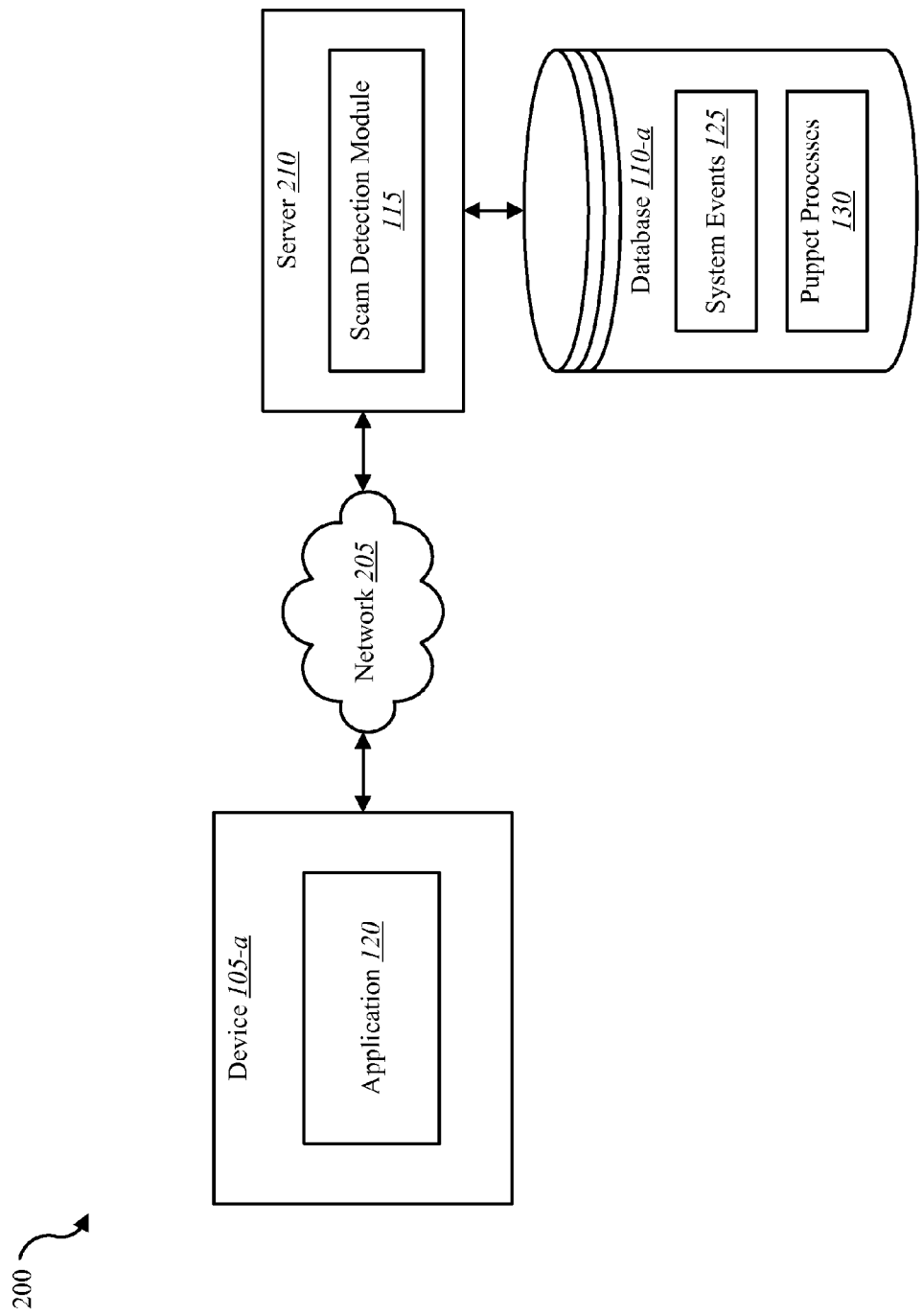
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-*a* may communicate with a server 210 and/or access database 110-*a* via a network 205. Database 110-*a* may be one example of database 110 from FIG. 1. Examples of network 205 include cloud networks, local area networks (LAN), wide area networks (WAN), virtual private networks (VPN), wireless networks (using 802.11, for example), cellular networks (using 3G and/or LTE, for example), etc. In some cases, network 205 includes the Internet.

In some configurations, the device 105-*a* may be one example of the device 105 illustrated in FIG. 1. As shown, device 105-*a* may not include a source identification module 115. For example, the device 105-*a* may include an application 120 that allows the device 105-*a* to interface with the source identification module 115 located on server 210. Accordingly, device 105-*a* may be configured to perform one or more functions of scam detection module 115 via application 120, network 205, and server 210. In some embodiments, both the device 105-*a* and the server 210 may include a source identification module 115 where at least a portion of the functions of the source identification module 115 are performed separately and/or concurrently on the device 105-*a* and the server 210.

In some embodiments, the server 210 may include the source identification module 115 and may be coupled to the database 110-*a*. For example, the source identification module 115 may access the system events 125 and/or puppet processes 130 in database 110-*a* via network 205 and server 210. The database 110-*a* may be internal or external to the server 210.

In some configurations, the application 120 may enable the device 105-*a* to interface with the source identification module 115 to identify potential scam campaigns by searching pre-filtered web pages, detect patterns among the pre-filtered web pages, and compare a user input to the detected patterns in order to notify a user in real-time of potential scams. Thus, the application 120, via the source identification module 115, may identify and warn users of potential scam campaigns.

Figure 3:
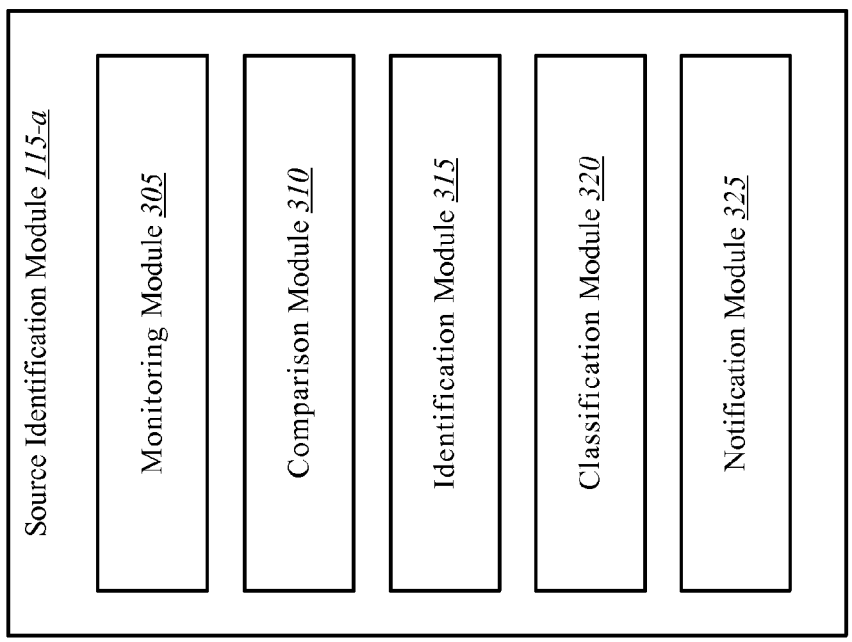
FIG. 3 is a block diagram illustrating one example of a source identification module.

FIG. 3 is a block diagram illustrating one example of a source identification module 115-*a*. The source identification module 115-*a* may be one example of the source identification module 115 depicted in FIGS. 1 and/or 2. As depicted, the source identification module 115-*a* may include a monitoring module 305, a comparison module 310, an identification module 315, a classification module 320, and a notification module 325.

As described above, a malicious process may target an otherwise innocuous, legitimate process to perform one or more actions on behalf of the malicious process. In some cases, the malicious process may target trusted process such as cmd.exe and configure the trusted process to perform malicious tasks on its behalf. The malicious process may configure the target process to perform the malicious tasks in order to avoid detection, allowing the malicious process to close or terminate itself after configuring the target process. Thus, the malicious process attempts to mask any involvement it plays in the execution of malicious instructions, allowing the malicious process to go undetected under conventional malware detection systems. Accordingly, the malicious process may be referred to as a launching process or source process, the process that is ultimately responsible for any malicious event arising from the target process. The target process may be referred to as a puppet process, as it is the malicious process that is ultimately pulling all the strings. Thus, to prevent a launching process from going undetected, source identification module 115-*a* may be configured to identify a source of a suspect event according to the systems and methods described herein.

In one embodiment, monitoring module 305 may register system events in a database. In some cases, the system events are registered via a kernel-mode driver. Monitoring module 305 may be configured to detect a suspicious event associated with a first process. Comparison module 310 may determine whether a first process (e.g., commandeered process) is one from a list of potential puppet processes. For example, a list of processes known to have been used as puppet processes and/or list of processes likely to be used as puppet processes may be referenced to determine whether the first process is associated with a process on the list. Additionally, or alternatively, a process may be included in the list of potential puppet processes based on one or more characteristics of the process. In some cases, the list of potential puppet processes includes at least one process with a command line interface. For example, a process featuring a command line interface may be considered more likely to be used by malicious entities as a puppet process than a process that does not feature a command line interface. Accordingly, a process featuring a command line interface may be included in the list of potential puppet processes. Additionally, or alternatively, the list of potential puppet processes may include at least one of the following: cmd.exe, rundll.exe, rundll32.exe, regsvr32.exe, dllhost.exe, regedit.exe, taskhost.exe, cscript, wscript, vbscript, perlscript, bash, ldconfig, terminal. app, and x-code-.app.

In one embodiment, classification module 325 may maintain a list of potential puppet processes. Classification module 325 may detect a new puppet process in association with the registered system events. For example, based on analysis performed by the source identification module 115-*a*, which may be based at least in part on the registered system events, it may be determined that process X is a puppet process. Classification module 325, however, may determine that process X does not appear on the list of potential puppet processes. Accordingly, upon determining that process X is not included in the list of potential puppet, classification module 325 may add process X to the list of potential puppet processes. Accordingly, the classification module 325 may identify a new puppet process by determining that a second process launches a first process, the second process configuring the first process to perform certain operations resulting in a suspect event, which may trigger increased scrutiny surrounding the suspect event. Thus, upon determining that the second process created and launched the first process that generates the suspect event and identifying the second process as the process that is actually responsible for the suspect event, the first process may be designated as a new puppet process and added as a potential puppet process in the database of potential puppet processes.

A malicious process may target a particular process because of certain characteristics of the targeted process. For example, the target process may include a command line interface enabling the malicious process to effectively control the target process remotely, even after the malicious process has terminated or even deleted itself. Thus, the target process may be referred to as a puppet process. Upon identifying the launching process that launched the process, identification module 315 may designate the target process as a puppet process. In some cases, monitoring module 305 may determine that the launching process closes upon launching the process. In some cases, determining that the launching process closes upon initiating the puppet process may provide further indication and increase the likelihood that the suspect event and launching process are malicious.

In some cases, the monitoring module 305 may determine that the puppet process is initiated via instructions supplied directly on a command line interface by a launching process. Additionally, or alternatively, the monitoring module 305 may determine that the puppet process is initiated via instructions included in a file. For example, the monitoring module 305 may determine that a launching process is responsible for supplying a path to one or more files on a command line interface of the puppet process. Accordingly, upon detecting a suspect event resulting from the execution of the instructions provided on the command line interface, the identification module 315 may identify the launching process as the process ultimately responsible for the suspect event.

The process that initiates the puppet process may be designated as a launching process or source process. Upon determining the process that generated the suspect event is a potential puppet process, identification module 315 may identify the launching process that initiates the puppet process. In some embodiments, identification module 315 may identify the launching process by querying registered system events stored in a database (e.g. system events 125). The system events may include process launch events, file system events, and the like. Accordingly, the system events registered in the database may indicate that the puppet process is launched by a particular process. Identification module 315 may designate this identified particular process as the launching process. In some embodiments, the system events may indicate that the launching process closes after initiating the puppet process. Accordingly, information obtained regarding actions, aspects, or characteristics of the launching process and/or the puppet process may provide indications regarding the source of suspect events. In one embodiment, notification module 320 may generate a notification upon detecting the suspect event and/or identifying the launching process. The notification may identify the launching process as the source of the suspect event. Thus, as described above, the source identification module 115 may use a file-system driver to track the creation of dead-drop files to the process that creates them. The source identification module 115 may monitor all process launches. Accordingly, when source identification module 115 detects a process launch (e.g., a puppet process launch) via command-line instructions that directly/indirectly points to one or more files (e.g., dead-drop files), the source identification module 115 holds the creator of the one or more files as the responsible process for anything that that puppet process does.

Figure 4:
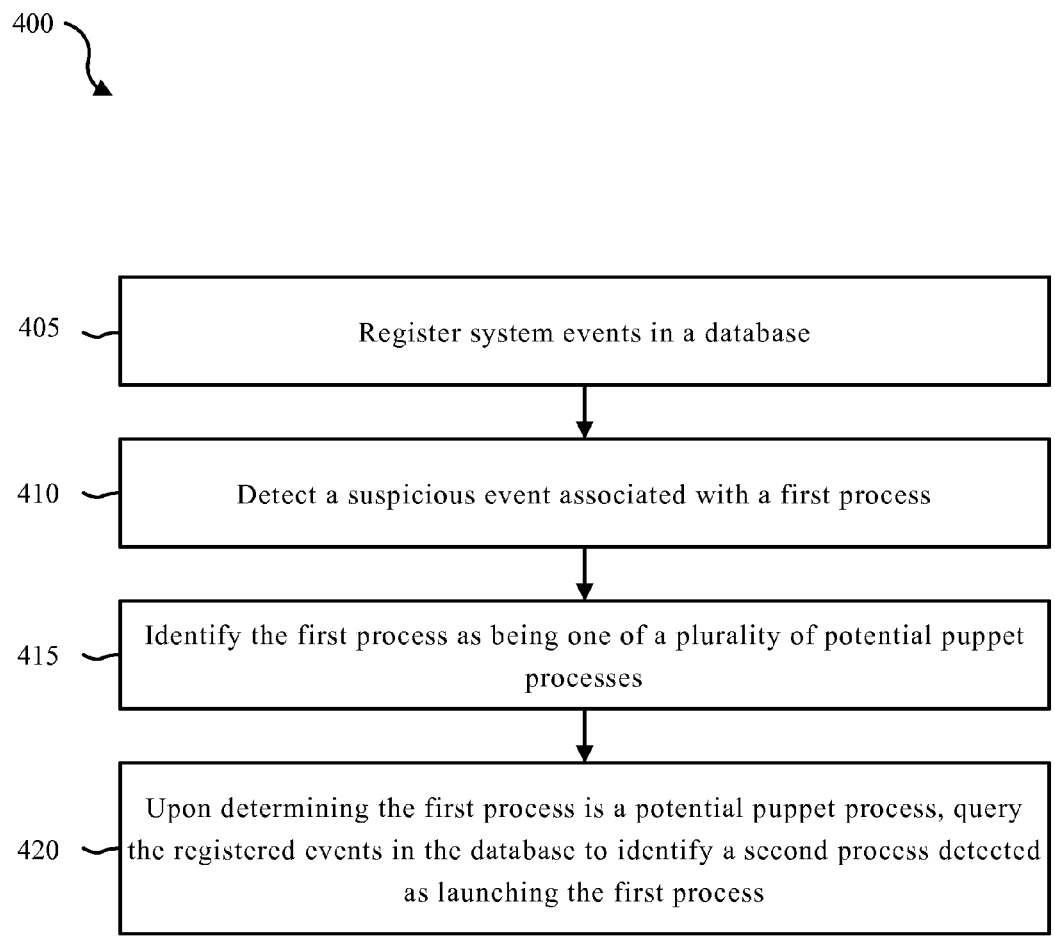
FIG. 4 is a flow diagram illustrating one embodiment of a method for identifying a source of a suspect event.

FIG. 4 is a flow diagram illustrating one embodiment of a method 400 for identifying a source of a suspect event. In some configurations, the method 400 may be implemented by the source identification module 115 illustrated in FIGS. 1, 2, and/or 3. In some configurations, the method 400 may be implemented by the application 120 illustrated in FIGS. 1 and/or 2.

At block 405, system events may be registered in a database. In some cases, the system events may be registered via a kernel-mode driver. At block 410, may be detected a suspicious event associated with a first process. At block 415, the first process may be identified as one of a plurality of potential puppet processes. At block 420, upon determining the first process is a potential puppet process, the registered system events in the database may be queried to identify a second process that is detected as launching the first process.

Figure 5:
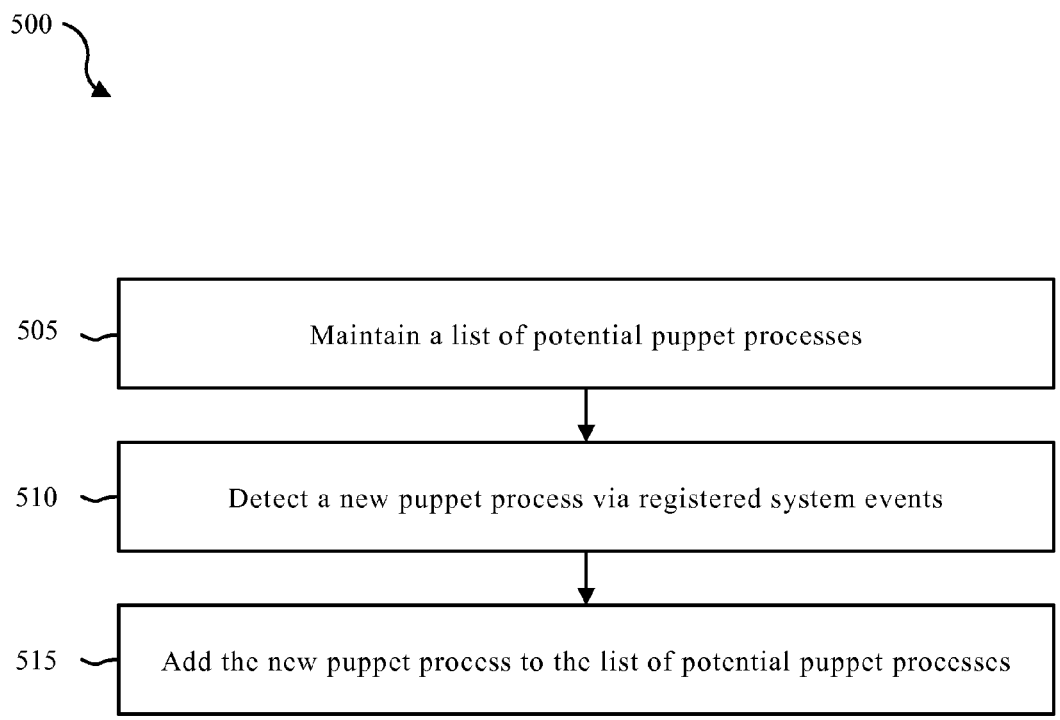
FIG. 5 is a flow diagram illustrating one embodiment of a method for maintaining a list of potential puppet processes.

FIG. 5 is a flow diagram illustrating one embodiment of a method 500 for maintaining a list of potential puppet processes. In some configurations, the method 500 may be implemented by the source identification module 115 illustrated in FIGS. 1, 2, and/or 3. In some configurations, the method 500 may be implemented by the application 120 illustrated in FIGS. 1 and/or 2

At block 505, a list of potential puppet processes. At block 510, a new puppet process may be detected via registered system events. For example, a kernel-mode driver may be employed to detect and register system events in a data-base. At block 515, the new puppet process may be added to the list of potential puppet processes.

Figure 6:
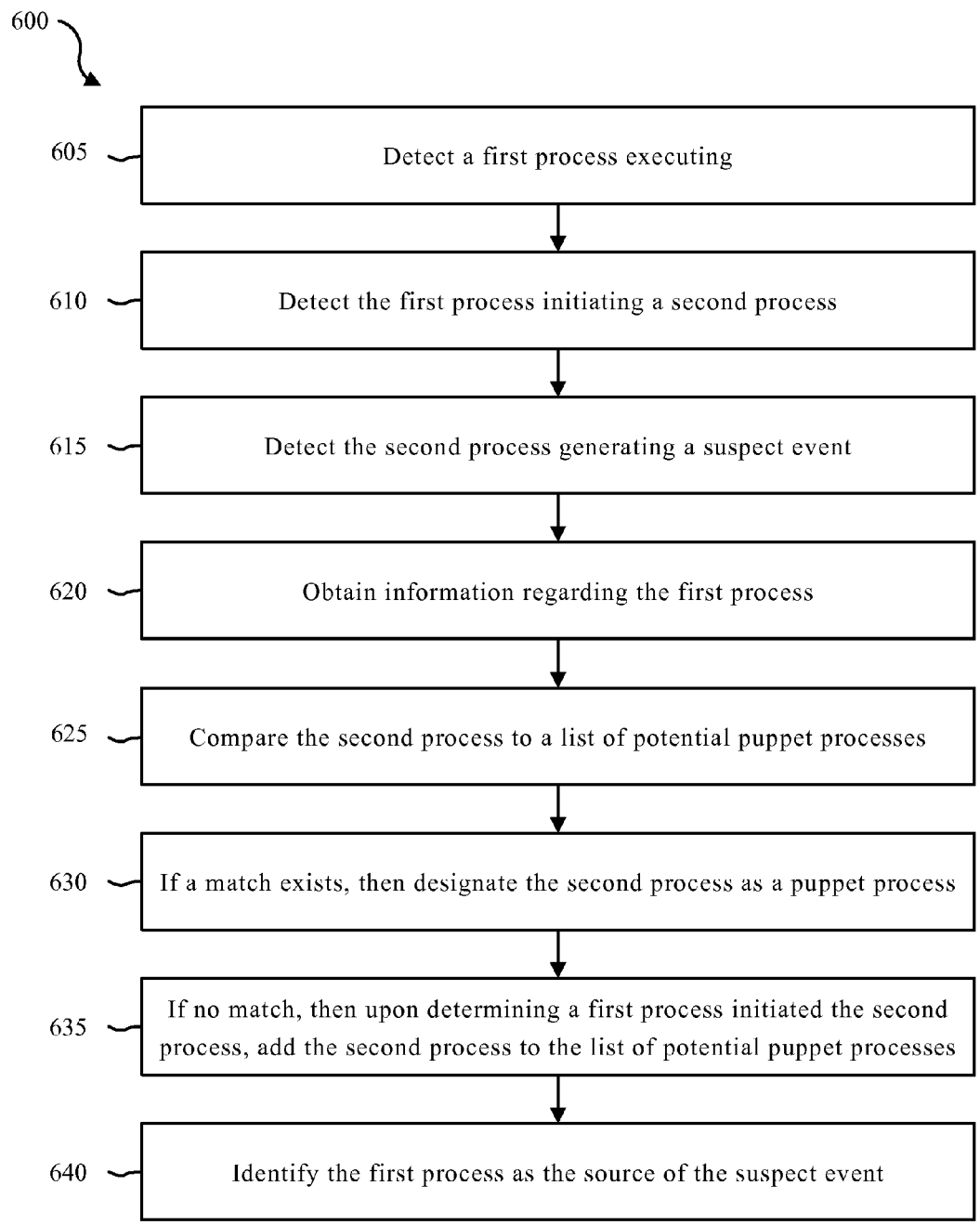
FIG. 6 is a flow diagram illustrating one embodiment of a method for identifying a source of a suspect event.

FIG. 6 is a flow diagram illustrating one embodiment of a method 600 for identifying a source of a suspect event. In some configurations, the method 600 may be implemented by the source identification module 115 illustrated in FIGS. 1, 2, and/or 3. In some configurations, the method 600 may be implemented by the application 120 illustrated in FIGS. 1 and/or 2.

At block 605, a first process executing may be detected. As described above, one or more system events may be registered and stored in a database. Accordingly, operations of the first process and other processes may be stored in such a database. At block 610, the first process may be detected initiating a second process. At block 615, the second process may be detected generating a suspect event. At block 620, information may be obtained regarding the first process. For example, registered system events may include data regarding the first process initiating the second process. In some cases, the registered system events may indicate that the first process closes after initiating the second process. At block 625, the second process may be compared to a list of potential puppet processes. Examples of such processes include a process initiated from a command line interface such as cmd.exe, rundll32.exe, etc. At block 630, if a match is found, the second process may be designated as a puppet process. At block 635, if no match, then upon determining that a first process initiated the second process, the second process may be added to the list. For example, upon determining that a first process initiated the second process and that the second process generated the suspect event, then the first process may be added to the list of potential puppet processes. At block 640, the first process may be identified as the source of the suspect event. As described above, in some cases, the first process may be identified via the system events that are registered via a kernel-mode driver. In some embodiments, upon identifying the first process as the source of the suspect event, a notification may be generated. In some cases, the notification may identify the launching process as the source of the suspect event. Additionally, or alternatively, the notification may identify the launching process as a potential malicious process.

Figure 7:
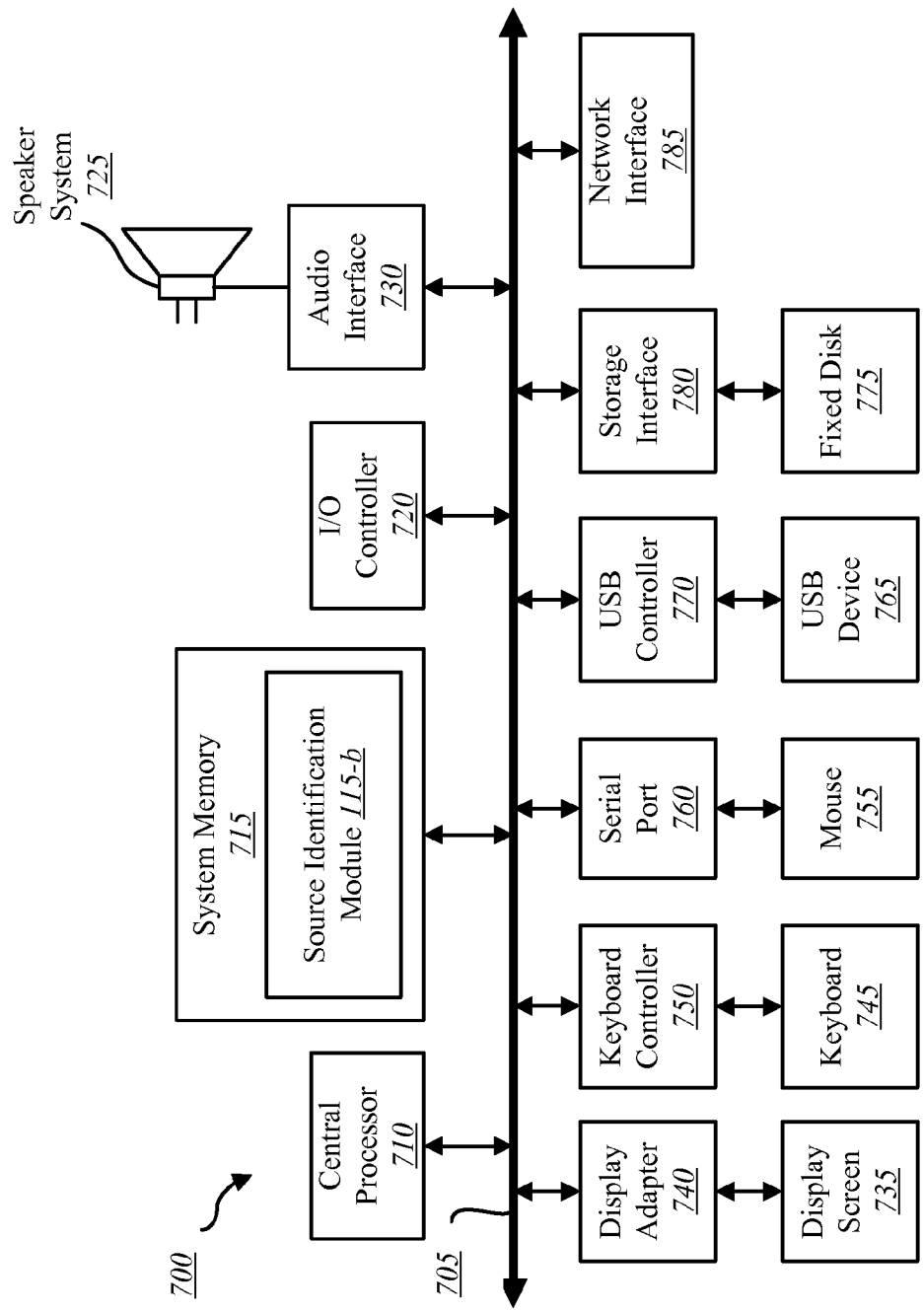
FIG. 7 depicts a block diagram of a computer system suitable for implementing the present systems and methods.

FIG. 7 depicts a block diagram of a computer system 700 suitable for implementing the present systems and methods. Computer system 700 includes a bus 705 which interconnects major subsystems of computer system 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, a keyboard 745 (interfaced with a keyboard controller 750) (or other input device), multiple USB devices 765 (interfaced with a USB controller 770), and a storage interface 780. Also included are a mouse 755 (or other point-and-click device) connected to bus 705 through serial port 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the source identification module 115-$b$ to implement the present systems and methods may be stored within the system memory 715. Applications (e.g., application 120) resident with computer system 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of computer system 700, can connect to a standard computer readable medium for storage and/or retrieval of information, such as a fixed disk drive 775. Fixed disk drive 775 may be a part of computer system 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 715 or fixed disk 775. The operating system provided on computer system 700 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for identifying a source of a suspect event, comprising:
   registering system events in a database, wherein the system events include detected process launch events;
   detecting a first process being launched, the first process being one of the detected process launch events;
   detecting a suspicious event associated with the first process;
   querying the registered system events in the database;
   analyzing a result of the query, the result of the query indicating an association between a second process and the first process, the second process being different from the first process;
   based at least in part on analyzing the result of the query, determining the second process launches the first process; and
   based at least in part on determining the second process launches the first process, identifying the first process as being one of a plurality of potential puppet processes.

2. The method of claim 1, further comprising:
   generating a notification, the notification identifying the second process as the source of the suspect event.

3. The method of claim 1, further comprising:
   determining that the second process closes upon initiating the first process.

4. The method of claim 1, further comprising:
   upon identifying the second process that initiated the first process, identifying the first process as a puppet process.

5. The method of claim 1, wherein the first process is initiated via instructions supplied directly on a command line interface by the second process.

6. The method of claim 1, wherein the first process is initiated via instructions from at least one file, a path to the at least one file being supplied on a command line interface by the second process.

7. The method of claim 1, further comprising:
   maintaining a list of potential puppet processes;
   detecting a new puppet process via the registered system events, wherein the new puppet process is one of the detected process launch events; and
   adding the new puppet process to the list of potential puppet processes.

8. The method of claim 7, wherein the list of potential puppet processes comprises at least one process with a command line interface.

9. The method of claim 8, wherein the list of potential puppet processes includes at least one of cmd.exe, rundll.exe, rundll32.exe, regsvr32.exe, dllhost.exe, regedit.exe, taskhost.exe, cscript, wscript, vbscript, perlscript, bash, ldconfig, terminal app, and x-code.app.

10. The method of claim 1, wherein the system events are registered via a kernel-mode driver.

11. A computing device configured to identify a source of a suspect event, comprising:
    a processor;
    memory in electronic communication with the processor;
    instructions stored in the memory, the instructions being executable by the processor to:
        register system events in a database, wherein the system events include detected process launch events;
        detect a first process being launched, the first process being one of the detected process launch events;
        detect a suspicious event associated with the first process;
        query the registered system events in the database;
        analyze a result of the query, the result of the query indicating an association between a second process and the first process, the second process being different from the first process;
        based at least in part on analyzing the result of the query, determine the second process launches the first process; and
        based at least in part on determining the second process launches the first process, identify the first process as being one of a plurality of potential puppet processes.

12. The computing device of claim 11, wherein the instructions are executable by the processor to:
    generate a notification, the notification identifying the second process as the source of the suspect event.

13. The computing device of claim 11, wherein the instructions are executable by the processor to:
    determine that the second process closes upon initiating the first process.

14. The computing device of claim 11, wherein the instructions are executable by the processor to:
    upon identifying the second process that initiated the first process, identify the first process as a puppet process.

15. The computing device of claim 11, wherein the first process is initiated via instructions supplied directly on a command line interface by the second process.

16. The computing device of claim 11, wherein the first process is initiated via instructions from at least one file, a path to the at least one file being supplied on a command line interface by the second process.

17. The computing device of claim 11, wherein the instructions are executable by the processor to:
    maintain a list of potential puppet processes;
    detect a new puppet process via the registered system events, wherein the registered system events comprise a detected process launch event; and
    add the new puppet process to the list of potential puppet processes.

18. The computing device of claim 17, wherein the list of potential puppet processes comprises at least one process with a command line interface.

19. A computer-program product for identify, by a processor, a source of a suspect event, the computer-program product comprising a non-transitory computer-readable medium storing instructions thereon, the instructions being executable by the processor to:
    register system events in a database, wherein the system events include detected process launch events;
    detect a first process being launched, the first process being one of the detected process launch events;
    detect a suspicious event associated with the first process;
    query the registered system events in the database;
    analyze a result of the query, the result of the query indicating an association between a second process and the first process, the second process being different from the first process;
    based at least in part on analyzing the result of the query, determine the second process launches the first process; and
    based at least in part on determining the second process launches the first process, identify the first process as being one of a plurality of potential puppet processes.

20. The computer-program product of claim 19, wherein the instructions are executable by the processor to:
    generate a notification, the notification identifying the second process as the source of the suspect event.

* * * * *